United States Patent
Ng

(10) Patent No.: US 7,636,511 B2
(45) Date of Patent: Dec. 22, 2009

(54) APPARATUS AND METHODS FOR DOWNLOADING RECORDER PROGRAMMING DATA IN A VIDEO SIGNAL

(75) Inventor: Yee K Ng, Hong Kong (CN)

(73) Assignee: Index Systems, Inc., Torotola (VG)

( * ) Notice: Subject to any disclaimer, the term of this patent is extended or adjusted under 35 U.S.C. 154(b) by 611 days.

(21) Appl. No.: 10/919,804

(22) Filed: Aug. 16, 2004

(65) Prior Publication Data
US 2005/0175316 A1 Aug. 11, 2005

Related U.S. Application Data

(63) Continuation of application No. 09/560,446, filed on Apr. 28, 2000, now abandoned, which is a continuation of application No. 08/778,588, filed on Jan. 3, 1997, now Pat. No. 6,058,238, which is a continuation-in-part of application No. 08/330,384, filed on Oct. 27, 1994, now abandoned.

(51) Int. Cl.
*H04N 5/91* (2006.01)
(52) U.S. Cl. .......................................... 386/83; 386/95
(58) Field of Classification Search ............. 386/46, 386/83, 95; 725/20, 93; 380/211
See application file for complete search history.

(56) References Cited

U.S. PATENT DOCUMENTS

| 4,224,644 A | 9/1980 | Lewis et al. |
|---|---|---|
| 4,430,669 A | 2/1984 | Cheung |
| 4,527,195 A | 7/1985 | Cheung |
| 4,554,579 A | 11/1985 | Citta |
| 4,577,239 A | 3/1986 | Sougen |
| 4,605,973 A | 8/1986 | Von Kohorn |
| 4,703,465 A | 10/1987 | Parker |
| 4,704,725 A | 11/1987 | Harvey et al. |
| 4,706,121 A | 11/1987 | Young |
| 4,908,707 A | 3/1990 | Kinghorn |

(Continued)

FOREIGN PATENT DOCUMENTS

DE 44 31 438 3/1996

(Continued)

OTHER PUBLICATIONS

Bach U. et al.,"Multimedia-Terminal ALS Endgeraet," Funkschau, De, Franzis-Verlag K.G. Munchen, vol. 68, No. 6, Mar. 1, 1996, pp. 70-75, (Translation only, pp. 1-9).

(Continued)

Primary Examiner—Huy T Nguyen
(74) Attorney, Agent, or Firm—Ropes & Gray LLP

(57) ABSTRACT

Apparatus and methods are provided for controlling recording of video programs. In one embodiment an apparatus for controlling the recording of video programs includes a device for retrieving a recorder identifier and recorder programming data from a television signal received from a television signal source, a device for determining whether the retrieved recorder identifier matches a first identifier for the apparatus, a device for storing the recorder programming data, if the retrieved recorder identifier matches the first identifier for the apparatus, and a device for using the stored recorder programming data to control recording. The device for retrieving a recorder identifier and recorder programming data from a television signal includes a vertical blanking interval decoder.

22 Claims, 13 Drawing Sheets

U.S. PATENT DOCUMENTS

| | | | |
|---|---|---|---|
| 5,014,125 | A | 5/1991 | Pocock et al. |
| 5,016,273 | A | 5/1991 | Hoff |
| 5,047,867 | A | 9/1991 | Strubbe et al. |
| 5,206,937 | A | 4/1993 | Goto |
| 5,233,654 | A | 8/1993 | Harvey et al. |
| 5,307,173 | A | 4/1994 | Yuen et al. |
| 5,335,079 | A | 8/1994 | Yuen et al. |
| 5,335,277 | A | 8/1994 | Harvey et al. |
| 5,446,488 | A | 8/1995 | Vogel |
| 5,488,409 | A | 1/1996 | Yuen et al. |
| 5,532,732 | A | 7/1996 | Yuen et al. |
| 5,585,838 | A | 12/1996 | Lawler et al. |
| 5,592,551 | A * | 1/1997 | Lett et al. .......... 380/211 |
| 5,692,214 | A | 11/1997 | Levine |
| 5,774,664 | A | 6/1998 | Hidary et al. |
| 5,774,666 | A | 6/1998 | Portuesi |
| 5,818,441 | A | 10/1998 | Throckmorton et al. |
| 5,929,849 | A | 7/1999 | Kikinis |
| 5,987,509 | A | 11/1999 | Portuesi |
| 6,005,565 | A | 12/1999 | Legall et al. |
| 6,058,238 | A | 5/2000 | Ng |
| 6,075,568 | A | 6/2000 | Matsuura |
| 6,091,884 | A | 7/2000 | Yuen et al. |
| 6,177,931 | B1 | 1/2001 | Alexander et al. |
| 6,239,794 | B1 | 5/2001 | Yuen et al. |
| 6,240,555 | B1 | 5/2001 | Shoff et al. |
| 6,367,080 | B1 | 4/2002 | Enomoto et al. |
| 2007/0067805 | A1 | 3/2007 | Macrae et al. |

FOREIGN PATENT DOCUMENTS

| | | |
|---|---|---|
| DE | 195 02 922 | 8/1996 |
| WO | WO 81/02961 | 10/1981 |
| WO | WO 97-12486 | 4/1997 |
| WO | WO 97-13368 | 4/1997 |
| WO | WO 97-22207 | 6/1997 |
| WO | WO 97-33434 | 9/1997 |

OTHER PUBLICATIONS

Hirtz Gentlemen et al., "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, (Translation, pp. 1-9).

Bach U. et. al. "Multimedia TV-Gereat," Radio Fernsehen Elektronik, De, Veb Verlag Technik. Berlin, vol. 45, No. 9, Aug. 1, 1996, pp. 28, 30-31, (Translation, pp 1-6).

Supplementary European Search Report, Feb. 25, 2000, Application No. EP 97 91 0985.

Gus Venditto, "Prodigy For Dummies", 1995, IDG Books, pp. 57-63 and 213.

U.S. Appl. No. 11/600,944, filed Nov. 15, 2006.

* cited by examiner

THURSDAY — 304

308 — [18] SPORTS RETROSPECTIVE; 60 MIN.[68713]
306 — 6 P.M. 24 NATURESCENE[5321]
A VISIT TO THE COLORADO NATIONAL MONUMENT NEAR GRAND JUNCTION, WHERE WILD FLOWERS, INSECT AND BIRDS ARE OBSERVED
[34] 52 NOTICIAS[62921][496649]
[40] DWIGHT THOMPSON -- RELIGION;[68553]
[50] HUMANITIES THROUGH THE ARTS[493065]
[56] BEVERLY HILLBILLIES -- COMEDY[496777]

FEBRUARY 10, 1989 — 302

300

FRIDAY — 304

308 — [CB] [DIS] [11] MOVIE -- DRAMA; 70 MIN.(236271113)
306 — 6:30 FAMILY TIES (CC) -- COMEDY[15657] — 312
MALLORY'S REUNION WITH HER COLLEGE BOY FRIEND (JOHN DUKAKIS) HAS HER WORRIED THAT SHE MAY NOT BE AS INTERESTING TO HIM AS SHE ONCE WAS.
[56] HOGAN'S HEROES -- COMEDY[510857]
CARTERS MASQUERADE AS A TRAITOR MAY BE KAPUT: A LOVELY FRAULEIN IS TRYING TO POISON HIM
[NIK] DOUBLE DARE-GAME(29225)
[C14] [TNN] VIDEOCOUNTRY(29129)
[C11] [USA] CARTOON EXPRESS(23561)
[C7] [5] CHARLES IN CHARGE(CC) -- COMEDY[1065]
7 P.M. WHILE PLANNING A PIZZA-PARLOR PARTY, CHARLES ALIENATES THE POWELL CHILDREN BY DISMISSING THEIR SUGGESTIONS ABOUT ORGANIZING THE EVENT.

APPARATUS AND METHODS FOR DOWNLOADING RECORDER PROGRAMMING DATA IN A VIDEO SIGNAL

This is a continuation of U.S. patent application Ser. No. 09/560,446, filed Apr. 28, 2000, which is a continuation of U.S. patent application Ser. No. 08/778,588, filed Jan. 3, 1997, which is a continuation-in-part of U.S. patent application Ser. No. 08/330,384, filed Oct. 27, 1994, now abandoned.

FIELD OF THE INVENTION

This invention relates generally to television and recorders and particularly to programming a video cassette recorder to control the recording of video programs.

DESCRIPTION OF THE RELATED ART

The video cassette recorder (VCR) has a number of uses, including playing back of tapes filmed by a video camera, playing back of pre-recorded tapes, and recording and playing back of broadcast and cable television programs.

To program a VCR for unattended recording of a television program, a two-step process is often used: (1) obtain the correct channel, date, time and length (CDTL) information from a television program guide, and (2) program this CDTL information into the VCR. Depending on the model, year and type of the VCR, the CDTL information can be programmed in various ways including: (i) pushing an appropriate sequence of keys in the console according to instructions contained in the user's manual, (ii) pushing an appropriate sequence of keys in a remote hand-held control unit according to instructions contained in the user's manual (remote programming), and (iii) executing a series of keystrokes in the remote hand-held control unit in response to a menu displayed on the television screen (on-screen programming). Other techniques for timer preprogramming have been suggested including: (iv) reading in certain bar-code information using a light pen (light pen programming), and (v) entering instructions through a computer or telephone modem. These various methods differ only in the physical means of inputting the information while the contents, being CDTL and certain power/clock/timer on-off commands are generally common although the detailed protocol can vary with different model VCRs. Methods (i) and (ii) described above can require up to 100 keystrokes, which has inhibited the free use of the timer preprogramming feature of VCRs. To alleviate this, new VCR models have included an "On-Screen Programming" feature, which permits remote input of CDTL information in response to a menu displayed on the television screen. Generally on screen programming of CDTL information requires an average of about 18 keystrokes, which is less than some of the prior methods but still rather substantial. Some of the other techniques such as (iv) above, require the use of special equipment such as a bar code reader.

In general the above approaches suffer from a number of drawbacks. First, the procedure for setting the VCR to record in advance can be quite complex and confusing and difficult to learn; in fact, because of this many VCR owners shun using the timer preprogramming record feature. Second, the transcription of the CDTL information to the VCR is hardly ever error-free; in fact, many users of VCR's timer preprogramming features express concern over the high incidence of programming errors. Third, even for experienced users, the process of entering a lengthy sequence of information on the channel, date, time and length of desired program can become tedious. Fourth, techniques such as reading in bar-code information or using a computer require special equipment. These drawbacks have created a serious impediment in the use of a VCR as a recording device for television programs. The effect is that time shifting of programs has not become as popular as it once was thought it would be.

The programming of a VCR for later unattended recording of one or more selected programs has been greatly simplified as disclosed in U.S. Pat. No. 5,335,079 issued Aug. 2, 1994, which is incorporated herein by this reference as though set forth in full. As disclosed in that patent a compressed code in association with the program is published in a program listing for the channel, date, time of day, and length of a program and the compressed code is entered by the user into a unit, such as a remote control or VCR, that has the capability of decoding the compressed code. The resulting CDTL information is stored and used to turn on the VCR and to select the described channel at the appropriate time.

SUMMARY OF THE INVENTION

It is an object of this invention to provide apparatus and methods for controlling a particular recorder for recording video programs.

It is another object of this invention to provide apparatus and methods for broadcasting recorder programming data that provides control for recording to only a particular recorder.

It is another object of this invention to provide users with a simple system for effecting VCR timer preprogramming or VCR programming.

According to the invention, apparatus and methods are provided for controlling recording of video programs. In one embodiment an apparatus for controlling the recording of video programs includes a device for retrieving a recorder identifier and recorder programming data from a television signal received from a television signal source, a device for determining whether the retrieved recorder identifier matches a first identifier for the apparatus, a device for storing the recorder programming data, if the retrieved recorder identifier matches the first identifier for the apparatus, and a device for using the stored recorder programming data to control recording. The device for retrieving a recorder identifier and recorder programming data from a television signal includes a vertical blanking interval decoder.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 7 is an illustration of part of a television calendar according to this invention;

DETAILED DESCRIPTION OF THE SPECIFIC EMBODIMENTS

Figure 1:
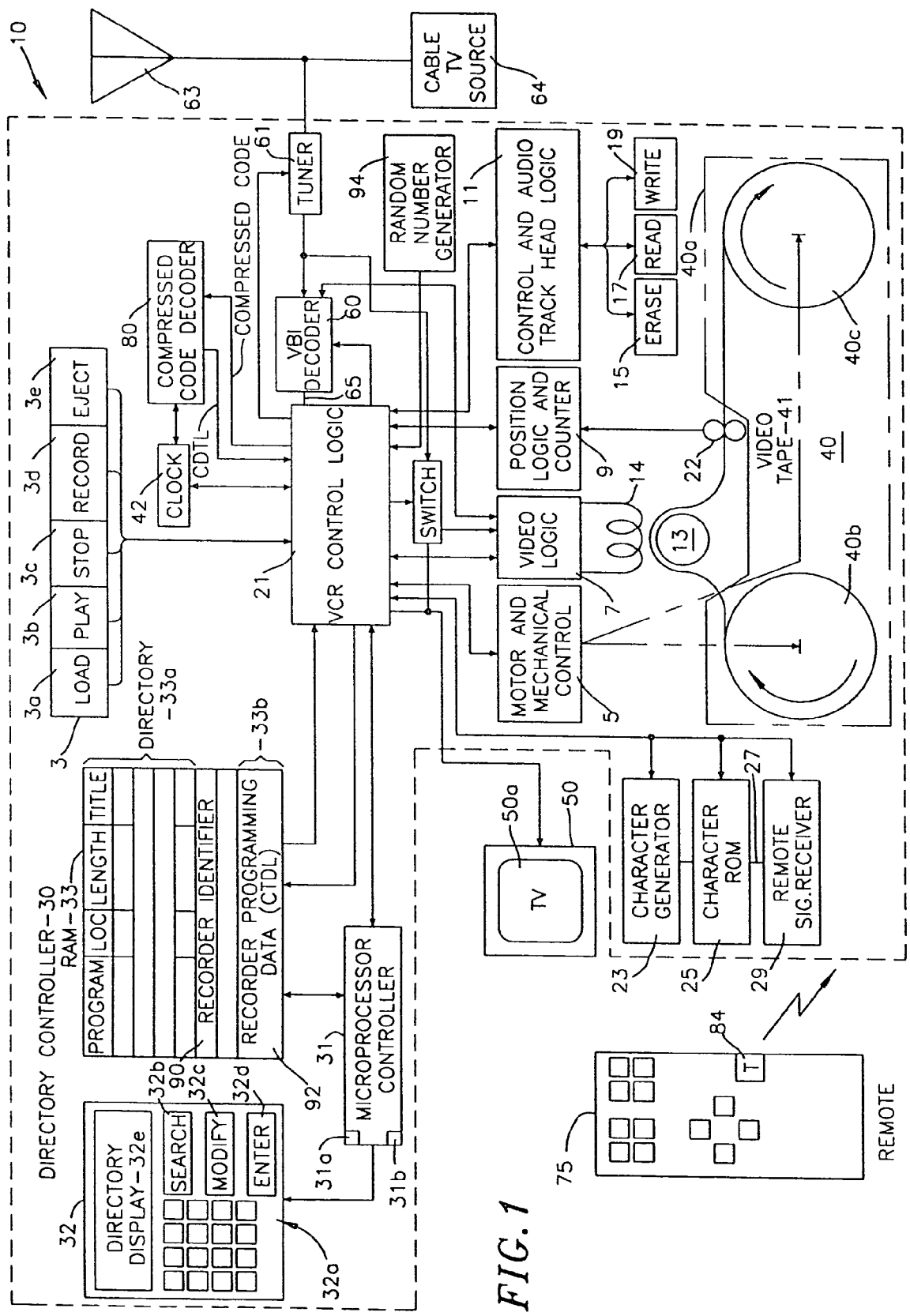
FIG. 1 is a block diagram illustrating a video cassette recorder according to the present invention.

Referring to the drawings, FIG. 1 is a block diagram illustrating a video cassette recorder 10 that provides indexing of recorded programs using a directory. The indexing VCR 10 includes a video cassette reader/recorder (VCR) function with a directory controller function 30. External to the indexing VCR 10 is a television monitor 50 and a remote controller 75. The VCR uses any one of many different recording technologies such as BETA, VHS, super VHS, 8 mm, VHS-C or any other popular technologies. The cassette 40 is a conventional video cassette having a magnetic tape 42 packaged in a cartridge 40a or cassette housing (hereafter called cassette) and transported between a feeding spindle 40b and a takeup spindle 40c. Even though the size and design of the housing is different for different types of recording technology, the basic information that goes on the tape itself is similar. The technology and operation of a conventional VCR are well understood in the art.

The indexing VCR 10 has a button control panel 3 with control buttons, including LOAD 3a, PLAY 3b, STOP 3c, RECORD 3d, and EJECT 3e for controlling the operation of the VCR. The LOAD button 3a is optional and is not used on machines which load automatically. The VCR control logic circuit 21 receives control signals from the button control panel 3 and controls the overall operation of the VCR by sending control signals to a motor and mechanical control logic circuit 5, a video logic circuit 7 a position logic and counter circuit 9, and a control and audio track head logic circuit 11, as well as to the microprocessor controller 31 of the directory controller 30.

The motor and mechanical control logic circuit 5 controls loading and ejecting of the cassette 40 and also controls movement of the video tape 41 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store 31a, such as a read-only-memory (ROM), for storing a control program to implement methods of the invention, and a clock 31b for generating a clock signal for timing functions and providing the time. The time may be set using the directory input/output display and control panel 32 in a manner known in the art. The microprocessor controller 31 controls the operation of the directory controller 30 and interfaces with the VCR control logic circuit 21 to implement the necessary functional capabilities for reading, updating and writing the directory. The microcontroller processor 31 in the indexing VCR 10 performs all indexing functions and human interface, interprets (e.g. tab, indent, screen format, attributes).

The RAM 33 is a conventional random access semiconductor memory which interfaces directly with the microprocessor controller 31. The RAM 33 is preferably non-volatile. Alternatively, the RAM 33 has a battery backup. The battery backup should maintain the contents of the memory for a predetermined time, e.g., 7 days, after the loss of power. The retention time may be shorter, if the indexing VCR uses an automatic backup of the memory onto video tape. A portion of the RAM 33, shown as system data 33b, is used for storing the system software of the microprocessor controller 31. The RAM 33 is also used for storing program directories 33a. The size of the RAM 33 is at the discretion of the manufacturer. However, the RAM 33 preferably can store the directory of at least 400 tapes. Accordingly, the RAM 33 has preferably at least 256 kilobits of memory for library storage. Effective memory size of the RAM 33 may be increased by using well known data compression techniques. Data recorded in the RAM 33 may be encoded or scrambled.

The directory input/output display and control panel 32 has an alphanumeric keyboard 32a and special function keys, such as a SEARCH key 32b for commanding searches for data in the directory 33a and on the tape 42, a MODIFY key 32c for modifying or deleting directory information in the RAM 33, and an ENTER key 32d for entering program directory information. Instead of providing special function keys, functions can also be initiated by entering predefined sequences of conventional keys on the alphanumeric keyboard 32a.

A display 32e is a conventional liquid crystal or other type display for displaying data being entered on the keyboard 32a, and to display the directory or other information stored in the RAM 33. Alternately, data can be shown on-screen a television display 50a. The directory information stored in the RAM 33 is processed by the microprocessor controller 31.

The VCR 10 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to a video display, such as television 50, at a position on the display determined by coordinates generated by the microprocessor controller 31, or the characters could be sent to display 32e. The end result is visual display of a alphanumeric character on the display screen.

As shown in FIG. 1, vertical blanking interval (VBI) signal decoder 60 is coupled to the output of a tuner 61, which receives a broadcast TV signal from an antenna 63, a cable TV signal source 64, or a satellite receiver system. The vertical blanking interval (VBI) is the time that the beam on a television is retracing from the bottom to the top of the screen. During this interval video is not written to the screen, thus, information can be sent during the vertical blanking interval. The VBI decoder 60 decodes data in the VBI of a received video signal. The VBI is further described below.

Directory data can be encoded in the VBI and retrieved by the VBI decoder 60 and provided to the directory controller for storage in RAM 33. For example, the directory data can include the program name and the program type. Note that directory data can also be entered into RAM 33 by using keypad 32a.

A decoder signal line 65 is coupled from the VBI decoder 60 to the VCR control logic circuit 21. The VCR control logic circuit 21 is commanded by the microprocessor controller 31 to store the decoded directory data in the directory 33a under control of a stored program in the RAM 33. The directory data can be displayed on the television 50 or the display 32e.

The use of the directory data to retrieve programs recorded on video tape 41 is further described in U.S. patent Ser. No. 08/176,852 filed, Dec. 30, 1993 which is incorporated herein by this reference as though set forth in full.

The VBI decoder 60 can also be used to retrieve a recorder identifier and recorder programming data from the television signal received by the VBI decoder 60 from the tuner 61. The user can enter and store a recorder identifier in RAM 33, such as shown by stored recorder identifier 90 in FIG. 1. The entered recorder identifier 90 is compared to the retrieved recorder identifier, which is retrieved from the television signal by the VBI decoder 60, and if the entered recorder identifier matches the retrieved recorder identifier, then the recorder programming data retrieved from the television signal by the VBI decoder 60 is stored under control of the VCR control logic 21 and the microprocessor controller 31 into the RAM 33, as shown by stored recorder programming data 92. The recorder programming data consists of a channel, a date, a time-of-day and a program length (CDTL) for a program to be recorded. Clock 42 is included in VCR 10 and keeps time including the time-of-day and a date. For example, the date could be Aug. 3, 1994 and the time-of-day could be 3:00 p.m.

The recorder programming data 92 is used to control the recording of programs of the programming data by the VCR 10. When the date and time-of-day of the recorder programming data, compare to the clock date and clock time-of-day, then the channel of the recorder programming data is used to tune the tuner 61 to the proper channel and then recording by the recorder is started. When the recording has continued for a time equal to the program length of the recorder program data, then the recording for that program is ended.

The VCR 10 also includes a compressed code decoder 80 which is further explained below. Briefly, the compressed code decoder can decode a compressed code which is representative of and compressed in length from the combination of a channel, a date, a time-of-day and a program length for a program to be recorded. The retrieved recorder programming data can include compressed codes. When the VBI decoder 60 retrieves a compressed code, the compressed code is sent to the compressed code decoder 80 by VCR control logic 21 to decode the compressed code into channel, date, time-of-day and program length, which are then stored in RAM 33 as shown by stored recorder programming data 92. Then the channel, date, time-of-day and program length are used in the manner described above to control the VCR 10 for recording programs.

The compressed code decoder can perform the decoding as a function of the clock 42. By making the decoding of the compressed codes a function of the clock, the algorithm for decoding the compressed codes is a function of time and therefore more difficult to derive.

The television signals received by tuner 61 are received by many such tuners in different VCRs, because the television signals received via antenna 63, cable TV signal source 64, or a satellite receiver system are broadcast to many receivers. The recorder identifier that is sent with the television signal and inserted into the vertical blanking interval of the television signal is affectively an address to a particular VCR or other apparatus that is identified by the broadcasted recorder identifier.

In order for a user to obtain recorder programming data from a television signal broadcasted from a station or cable TV source, the user calls a representative at a station and informs the representative of the recorder identification for his/her VCR 10. The user also identifies programs to be recorded or selection criteria to be used to select programs for recording. The representative can be an actual person who answers the phone and then enters the data into a computer, or the representative function can be automated and the user can enter the required data via telephone touch-tones. The computer at the remote site can then be used to convert the identified programs or program selection criteria into a set or sets of channel, date, time-of-day and program length (CDTL) data. The computer is linked to a station which can insert the recorder identification and the set of CDTL data for programs to be recorded into the vertical blanking interval of a transmitted TV signal.

Instead of generating a set of channel, date, time-of-day and program length, (CDTL) data the computer can also generate a set of compressed codes, each compressed code being compressed in length from the combination of the lengths of the channel, date, time-of-day and program length data.

There is sufficient band-width available to insert the requests from many users into the vertical blanking interval of a transmitted TV signal. All that is required is to transmit the data for a particular user prior to the time that the programs to be recorded are broadcasted. If multiple users request to have recorder programming data downloaded to their VCR via data inserted in the vertical blanking interval of a broadcast television signal, then the insertion of a recorder identification and recorder programming data is performed for one user and then the same step is performed for the next user and so on. It is assumed that the VCR 10 is turned on at all times, so that whenever the signal is transmitted with the recorder identification and the recorder programming data inserted into the vertical blanking interval, the VCR 10 will be ready to retrieve the data using the VBI decoder 60.

Rather than the user entering a recorder identifier into the VCR 10 and storing it in the RAM 33 as shown by a recorder identifier 90 and then calling the representative in order to inform the representative of the recorder identifier to use when transmitting the recorder program data for the user's VCR, the VCR 10 can include a random number generator 94 which is used to generate a recorder identifier. The use of a random number generator 94 to generate a recorder identifier reduces the probability that any two users will select the same recorder identifier for their VCR 10. The random number generator 94, generates a random number which is then displayed to the user either on directory display 32e or on television 50. The user then reads the random number and calls the representative and gives the representative the random number to use as a recorder identifier. At the same time the current random number in random number generator 94 is stored in RAM 33 in the recorder identifier 90 location. Then when the random number that has been given to the representative is inserted in the vertical blanking interval for a broadcast television signal, the VCR 10 extracts the random number using the VBI decoder 60 and compares it to the recorder identifier 90 stored in RAM 33. If the random number and the recorder identifier 90 are the same then the VCR control logic knows that the recorder programming data that is sent together with the random number is meant for this VCR. The VCR control logic then takes the recorder programming data which is extracted by the VBI decoder 60 and stores the recorder programming data in RAM 33 as shown in FIG. 1.

It is important that the random number generated by one VCR be different than a random number generated by another VCR so that each VCR will have a unique recorder identifier. In one implementation for generating a random number, a first twelve bit counter and a second twelve bit counter are provided in the VCR. At power up of the VCR, the two counters start counting clock pulses. When the user presses a first and then a second key (these could be the same key) on the remote controller, the first twelve bit counter and then the second twelve bit counter, respectively, stop counting. Preferably, the first and second keys issue regular operating commands to the VCR, for example, setup commands, such as clock set or channel map set up or VCR programming commands, such as channel, day, start time, and/or end time. The counts of the two twelve bit counters are then combined to form a 24 bit recorder identifier. Because the counters are very fast and the times that the first and second keys are pressed are very random, the recorder identifier is sufficiently random such that two VCRs only have approximately one chance out of sixteen million to have identical recorder identifications.

The following description details how the recorder identifier and the recorder programming data is inserted into the vertical blanking interval of a broadcast television signal. First, the vertical blanking interval itself is described.

Video images in a cathode ray tube (CRT) type-video device, e.g. television, are generated by scanning a beam along a predefined pattern of lines across a screen. Each time all the lines are scanned, a frame is said to have been produced. In one implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every 1/30 of a second in a process known as interlacing. Another standard in the world uses 625 lines of information and interlace 312 and 313 lines at 50 fields per second. In the 525 line standard used in the United States, approximately 480 lines are displayed on the television screen.

Figure 2:
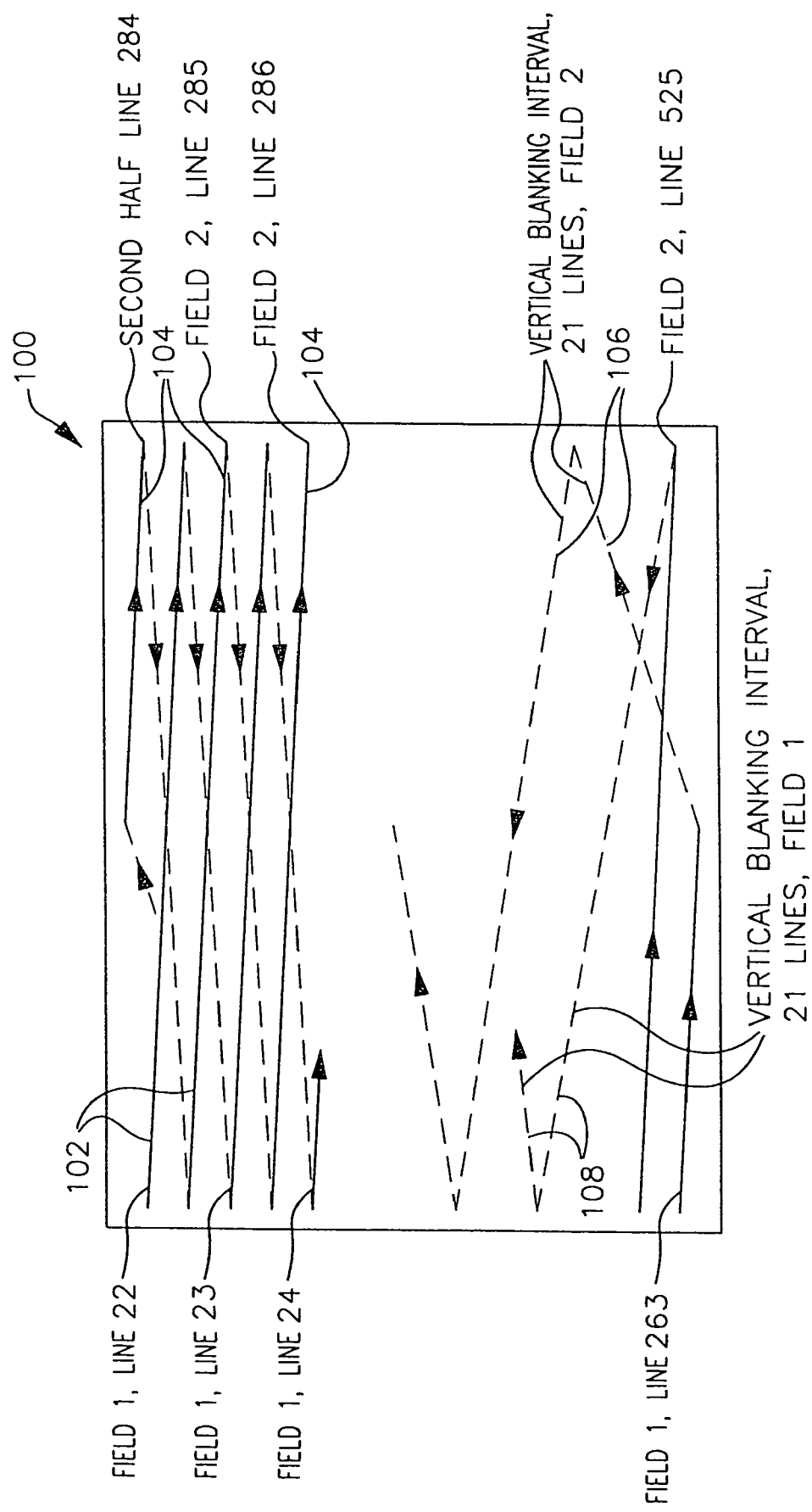
FIG. 2 is a schematic diagram illustrating an interlaced raster scanning pattern of a conventional television.

Referring now to the drawings, FIG. 2 is a schematic diagram illustrating the interlaced scanning pattern 100 on a screen of a conventional television receiver. A video display scans the beam from the top left hand corner and scans across the screen (line 22, field 1 in FIG. 2). After it finishes scanning the first line, the beam returns to the left hand side during a period known as a horizontal blanking interval and repeats scanning along another line which is parallel to but lower than the previous line (line 23, field 1 in FIG. 2). The scanning continues along the lines until the beam reaches the center of the bottom part of the screen (line 263, field 1) to complete field 1, which is comprised of lines 102.

From the bottom center of the screen, the beam returns to the top where it starts scanning from substantially the center of the screen along the lines 104 for field 2 which interlace the lines of field 1. This is not an instantaneous bottom to top jump but actually requires the length of time to scan 21 horizontal lines. These lines 106 are lines 1 through 21 of field 2. The second half of line 21 field two (line 284 as shown in FIG. 2) is displayed. Then lines 285 to 525 of field 2 are scanned to complete field 2. When the beam reaches the bottom, right hand corner of the screen, the picture frame is formed. Then the beam retraces to the top and the vertical blanking interval lines 108 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard with 21 lines in each VBI are well known in the art and therefore are not discussed in detail herein.

Figure 4:
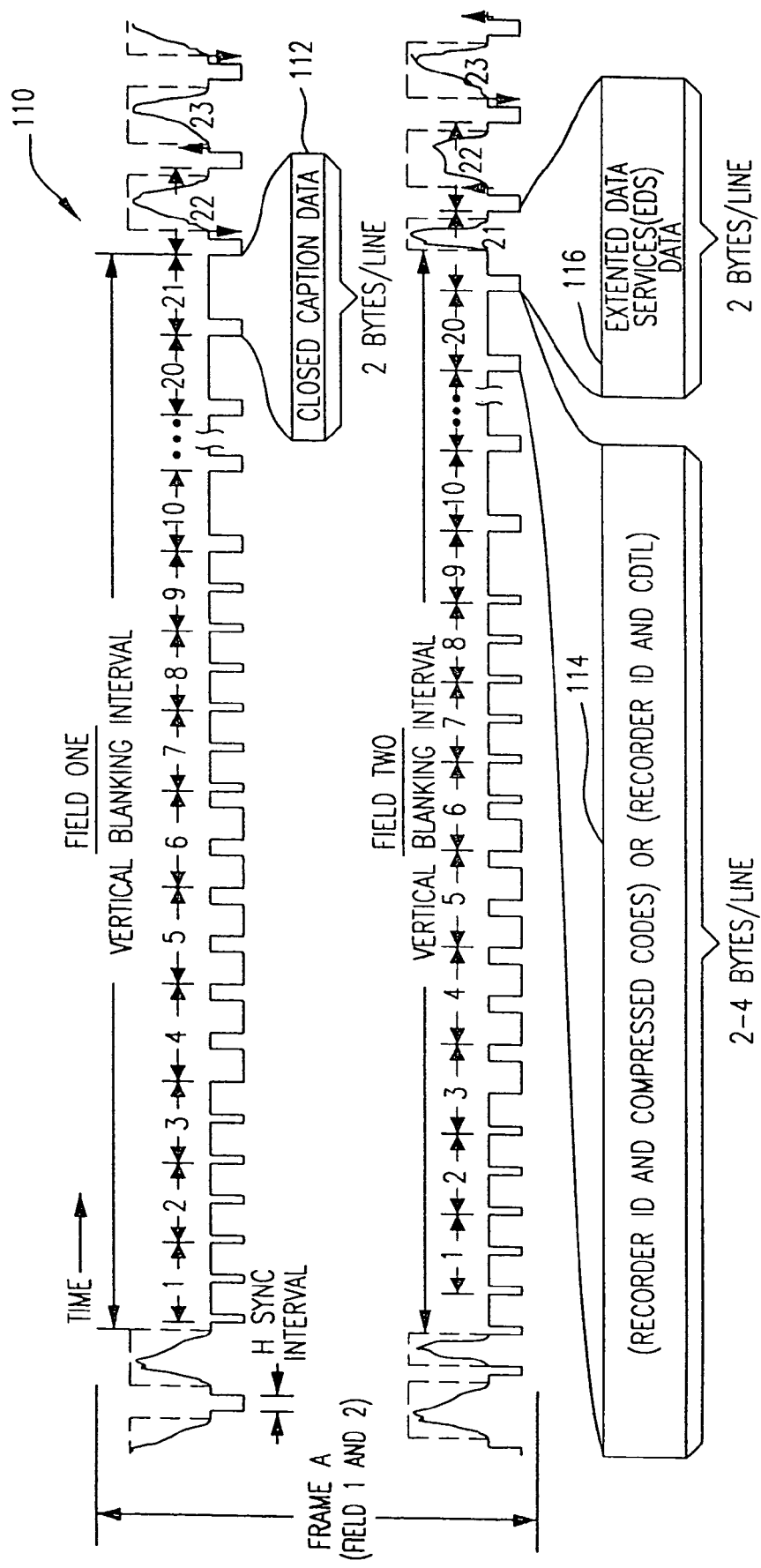
FIG. 4 is a timing diagram showing the vertical blanking interval (VBI) lines of field 1 and field 2.

Because no image is produced on the display during the vertical blanking interval, no picture information therefore needs to be carried by the broadcast signals. Thus, the VBI is used for conveying auxiliary information from a television network or station to an audience. For example, closed caption data associated with the television program are transmitted as encoded composite data signals in VBI line 21, field 1 of the standard NTSC video Signal, as shown in FIG. 4.

Lines 1 through 9 of the VBI of each field are used for vertical synchronization and post equalizing pulses. Thus, lines 10 through 21 are available for auxiliary information.

Figure 3:
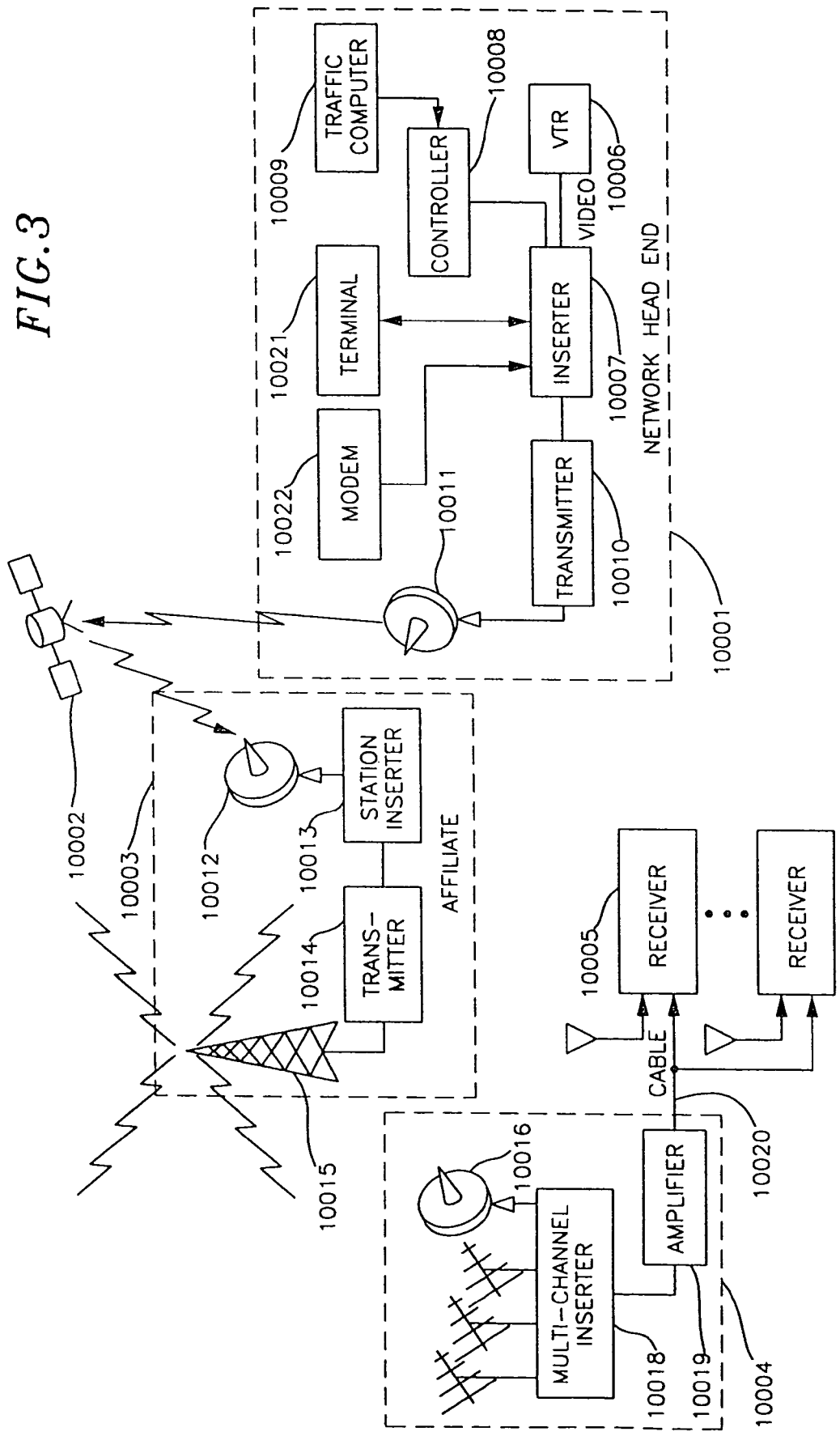
FIG. 3 is a functional block diagram of a television video and data transmission system.

FIG. 3 is a functional block diagram of a data transmission system. As used herein, the terms "broadcast" and "transmit" are used interchangeably for the transmission of signals over cable or fiber optics, to or from satellites, over the air, and the like. A network head end 10001 transmits a composite television signal containing inserted information in a portion thereof, typically the vertical blanking interval, to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual receivers 10005, which can include televisions, cable boxes, VCRs and satellite receivers. In addition, the individual receivers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa). Furthermore, the controller 10008 controls the lighting of stages during live broadcasts, such as news broadcasts. The controller 10008 is typically a microprocessor based system. A traffic computer 10009 controls the exact timing of playing individual segments of video tapes and inserting commercials therebetween as well as switching between different programs. Some network head ends have both a traffic computer 10009 and a controller 10008. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal, as will be described below, and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite dishes 10016 and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to individual receivers 10005. Alternately the receivers 10005 could receive broadcast information via antennas or satellite receivers.

Each receiver 10005 includes a VBI decoder, which can include a VBI slicer and closed caption decoder, that scans VBI lines 10-21 of both fields 1 and 2. In addition it is possible to use the first few visible lines in each video frame for VBI data, for example, lines 22-24. Lines 1 through 9 are typically used for vertical synchronization and equalization and, thus, are not used to transmit data. Closed captioning and text mode data are generally transmitted on VBI line 21, field 1 of the standard NTSC video signal, at a rate of 2 bytes for each VBI line 21, field 1, as shown by closed caption data 112 in FIG. 4. The text mode fields fill the entire screen with text. The default mode is an open ended mode in which the page is first filled up and then scrolled up. The individual recipient of such data has no control over the data. Extended data services (EDS) data can be transmitted on VBI line 21, field 2, as shown by EDS data 116 in FIG. 4, at a rate of 2 bytes per VBI line 21, field 2.

By way of background, the data in the vertical blanking interval can be described in terms of the wave form, its coding and the data packet. The closed caption data wave form has a clock run-in followed by a frame code, followed by the data. The coding of the data is non-return-to-zero (NRZ) 7 bit odd parity.

Under mandatory FCC requirements effective July 1993, color televisions having a size 13" and greater must provide a closed caption decoder. Caption data decoding is further described in the following specifications, which are hereby incorporated by reference herein: Title 47, Code of Federal Regulations, Part 15 as amended by "CLOSED CAPTION DECODER REQUIREMENTS FOR THE TELEVISION RECEIVERS"; Title 47, C.F.R., Part 73.652 (a)(22), Caption Transmission format; Title 47, C.F.R. Part 73.699, FIG. 6; "TELEVISION SYNCHRONIZING WAVE FORM"; Title 47, C.F.R., Part 73.699, FIG. 17*a*; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the *Recommended Practice for Line* 21 *Data Service*, Electronics Industries Association, EIA-608 (drafts Oct. 12, 1992 and Jun. 17, 1993) (hereinafter referred to as "EIA-608" standard"), the subject matter of which is incorporated herein by reference, additional data is provided in line 21, field 2 of the vertical blanking interval. This recommended practice includes two closed captioning fields, two text mode fields and the extended data services. The extended data includes, among other information, program name, program length, length into show, channel number, network affiliation, station call letters, UCT (universal coordinated time) time, time zone, and daylight savings time usage. Upstream at the network, the network inserts the program name, the length of the show, the length into the show, the network affiliation, and the UCT time. Downstream at the affiliate, the affiliate inserts the channel number, the time zone, the daylight savings time usage and program names. The network inserts the data that does not differ for different affiliates.

The data is transmitted in packets six classes of packets are proposed in the EIA-608 standard, including: (1) a "Current" class for describing a program currently being transmitted; (2) a "Future" class for describing a program to be transmitted later; (3) a "Channel Information" class for describing non-program specific information about the transmitting channel; (4) a Miscellaneous class for describing other information; (5) a "Public Service" class for transmitting data or messages of a public service nature such as National Weather Service Warnings and messages; and (6) a "Reserved" class reserved for future definition.

The data inserted into the television signal by the various inserters includes closed captioning data and EDS data. The inserted data can also include other data such as programming data which can be channel, date, time-of-day and program length (CDTL) or compressed codes representing the CDTL, as shown by data 114 in FIG. 4. As will be explained this data is inserted into a program video segment. The data can be inserted into either or both fields in any VBI line between 10 and 20. For example the data can be inserted into line 20 of field 2, as shown by the data 114 in FIG. 4. The data may be inserted into the VBI at the closed caption rate (1× format) or at two times the closed caption rate (2× format), which is further explained below.

The data may be manually entered from a local terminal 10021. The local terminal 10021 may be used to pre-build, recall, or edit messages. The terminal 10021 typically includes a computer. In addition, a modem 10022 may be used to provide data to the inserter 10007. The data may be provided manually or automatically from remote sites, such as a television program guide publisher or the network head end. The output of the inserter 10007 is a composite television signal with the data inserted.

The timing of video signals in NTSC format is well known in the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard.

Figure 5:
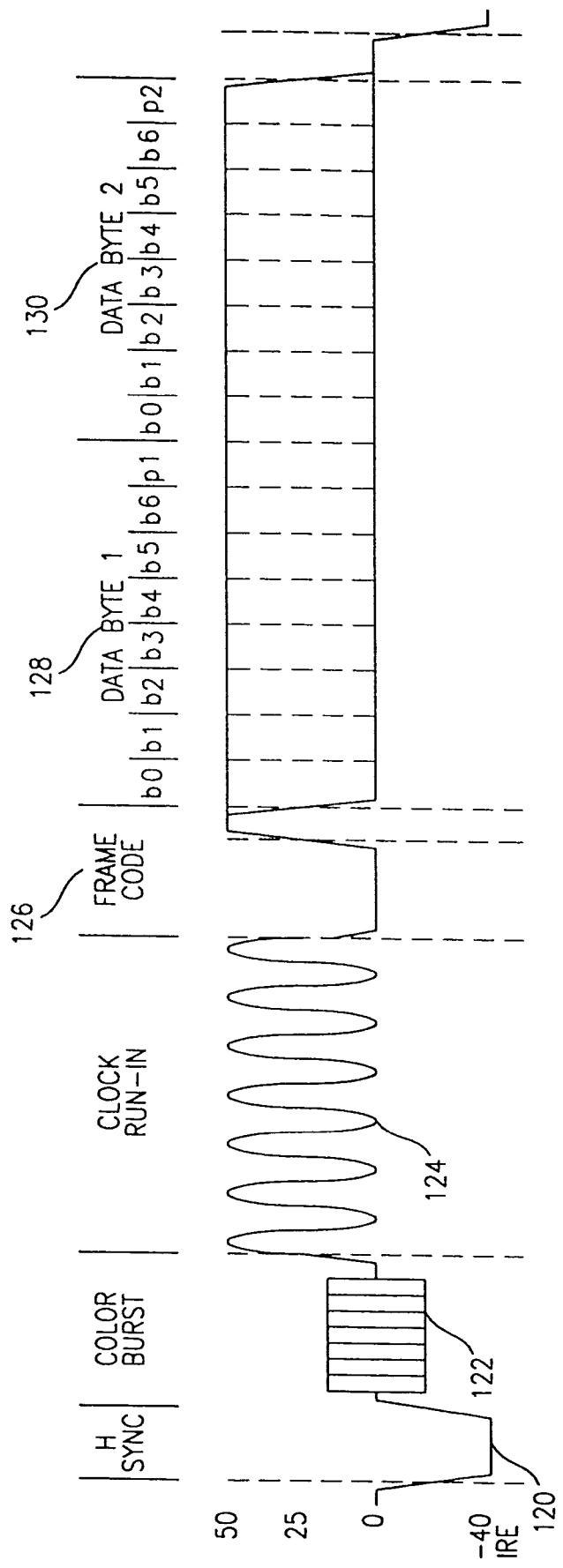
FIG. 5 is a timing diagram of the standard data format (ix) for transmitting data in the VBI.

As shown in FIG. 5, the horizontal synchronization pulse 120 is followed by color burst signals 122. For closed caption and EDS data, a clock run-in cycle 124 follows the color burst which in turn is followed by a frame code 126. The clock run-in is "10101010101." The frame code is "01000011." Two data bytes 128 and 130 are transmitted in each VBI line. Each byte is 8 bits including a parity bit. This format is referred to as the standard data rate format (or 1× format). Each byte in the VBI line is arranged with the least significant byte first. The last bit is used as parity for error checking. Each byte of the transmitted data is parity checked upon receipt. The 1× format is the format used to transmit closed captions in VBI line 21 field 1, as shown by closed caption data 112 in FIG. 4. It is also the format used to transmit EDS data in VBI line 21 field 2, as shown by EDS data 116 in FIG. 4.

Figure 6:
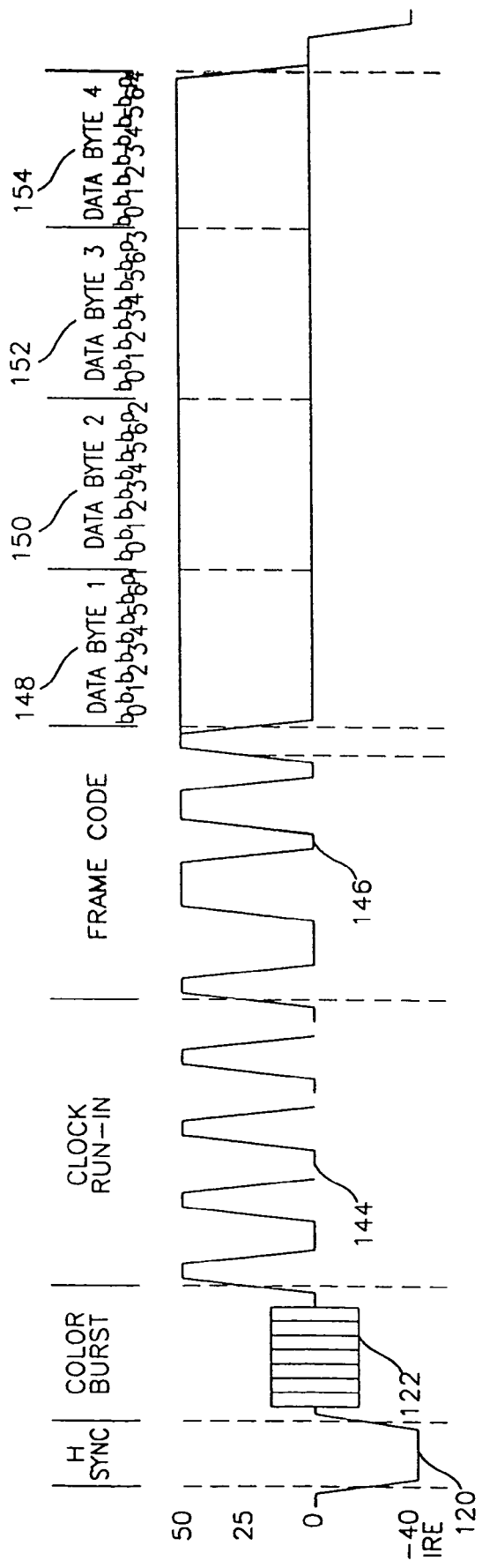
FIG. 6 is a timing diagram of the accelerated data format (2×) for transmitting data in the VBI.

An accelerated data format (2× format) as shown in FIG. 6 uses a bit rate twice that of the 1× format to thereby provide 4 bytes per VBI line. The clock run-in 144 is the bit sequence "10101010." The frame code 1 is "10011101101." Four data bytes 148, 150, 152 and 154 are transmitted each VBI line. The 2× format can be used to transmit data 114 in FIG. 4.

Now that the manner of inserting the recorder identification and the recorder programming data into the vertical blanking interval has been described, the use of compressed codes for representing CDTL information will be described.

FIG. 7 shows a television calendar 300 which has compressed codes. For example, the compressed code for Sports Retrospective on channel 18 at 6:00 p.m. is 68713. The compressed code for the game Double Dare on Nickelodeon has a compressed code of 29225. The television calendar has multiple day of year sections 302, multiple day section 304, multiple time-of-day section 306, channel identifiers 308 and descriptive program identifiers 310, including the name of the program arranged in a manner that is common in television guide publications. Arranged in relation to each channel identifier is a compressed code indication 312, which is a compressed code representative of and compressed in length from the combination of a channel, a date, a time of day and a program length for a program to be recorded.

Downloading recorder programming data via the vertical blanking interval allows the user to program the VCR even when the user is away from home. The user can look up a program in a television calendar such as the calendar shown in FIG. 7, and select the programs that he wishes to record. Then the user could call the representative and give the representative his recorder identification number and indicate the programs that he wishes to record. A user could give the CDTL information to the representative or could give compressed codes such as compressed code 312 to the representative. Then as long as the video cassette recorder has blank tape inserted-in the video cassette recorder, the VCR can be programmed via the recorder programming data downloaded in the vertical blanking interval and then record the programs on the proper channels at the proper times.

The following describes a method for decoding a compressed code into CDTL data. A method is also described for encoding CDTL data into compressed codes.

Figure 8:
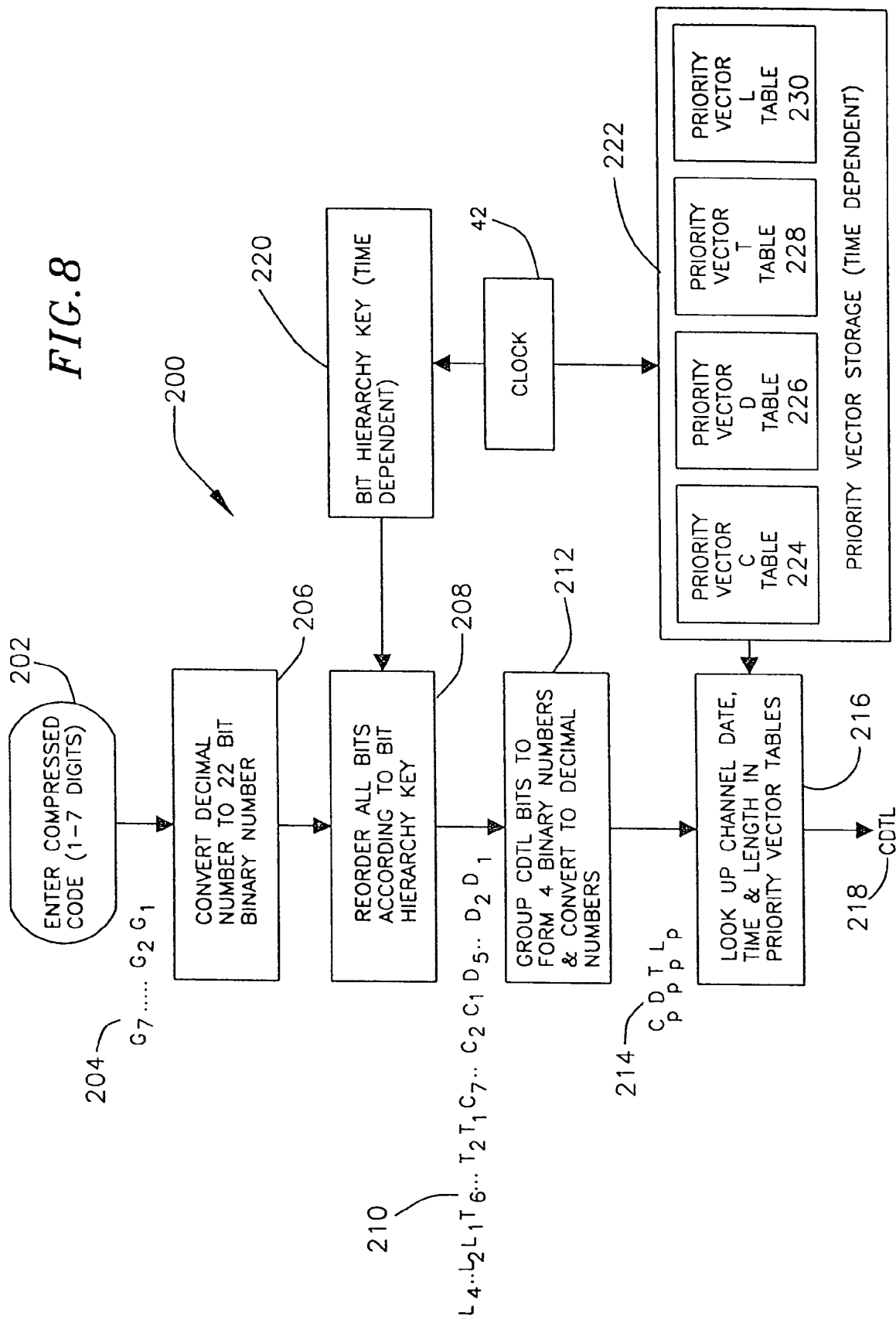
FIG. 8 is a flow graph of the compressed code decoding technique according to the present invention.
Figure 9:
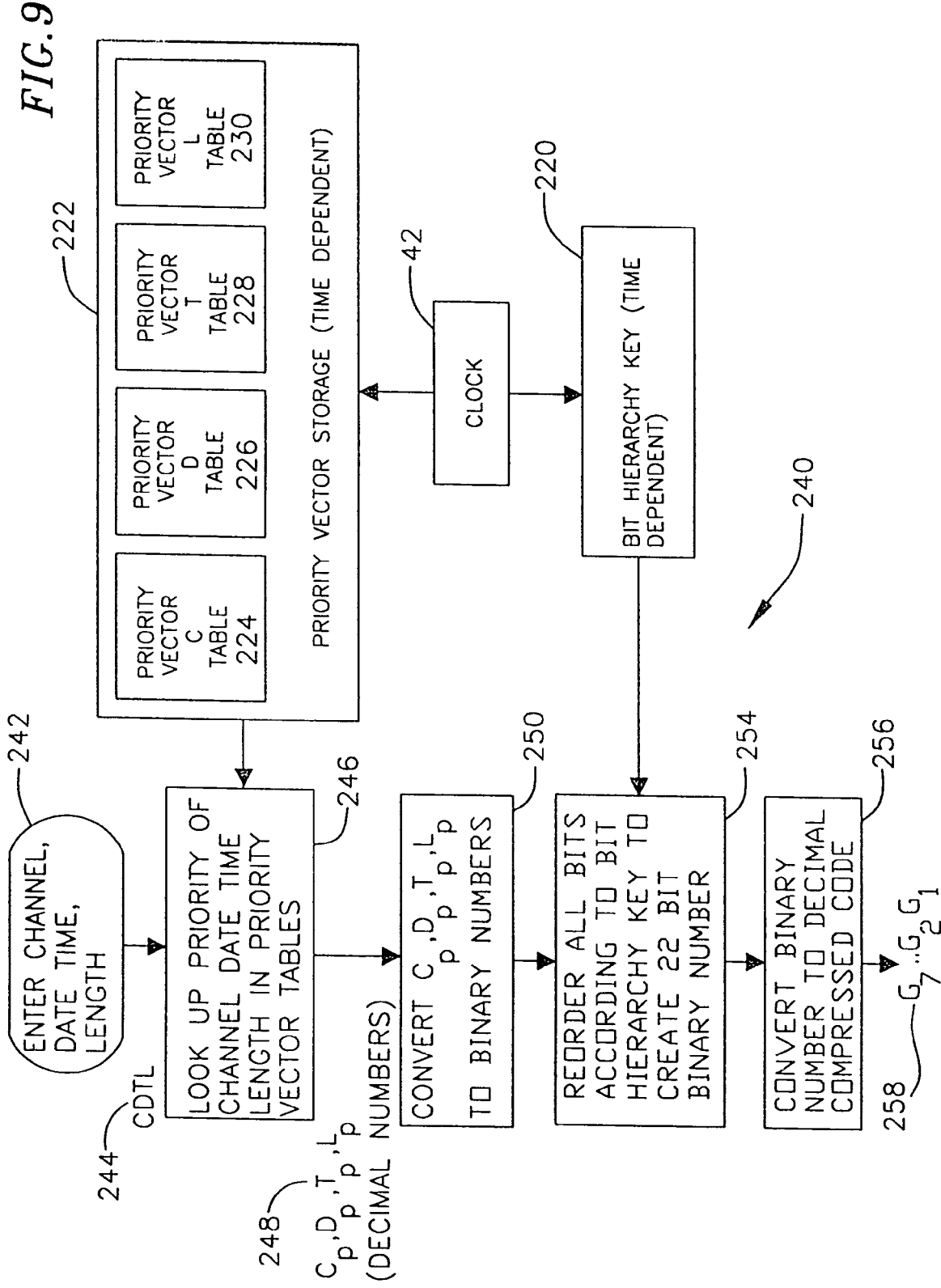
FIG. 9 is a flow graph of the compressed code encoding technique according to the present invention.

FIG. 8 is a flow diagram of a preferred compressed code decoding technique. To understand compressed code decoding, it is easiest to first explain the compressed code encoding technique, for which FIG. 9 is the flow chart. Then the compressed code decoding technique, which is the reverse of the compressed code encoding will be explained.

The encoding of the compressed codes can be done on any computer and is done prior to preparation of any program guide that would include compressed codes. For each program that will be printed in the guide, a channel, date, time and length (CDTL) code 244 is entered in step 242. Step 246 separately reads the priority for the channel, date, time and length in the priority vector storage 222, which can be stored in a read only memory. The priority vector storage 222 contains four tables: a priority vector C table 224, a priority vector D table 226, a priority vector T table 228 and a priority vector L table 230.

The channel priority table is ordered so that the most frequently used channels have a low priority number. An example of the data that is in priority vector C table 224 follows.

| channel  | 4 | 7 | 2 | 3 | 5 | 6 | 11 | 13... |
|----------|---|---|---|---|---|---|----|-------|
| priority | 0 | 1 | 2 | 3 | 4 | 5 | 6  | 7...  |

Generally the dates of a month all have an equal priority, so the low number days in a month and the low number priorities would correspond in the priority vector D table as in the following example.

| date     | 1 | 2 | 3 | 4 | 5 | 6 | 7 | 8... |
|----------|---|---|---|---|---|---|---|------|
| priority | 0 | 1 | 2 | 3 | 4 | 5 | 6 | 7... |

The priority of the start times would be arranged so that prime time would have a low priority number and programs in the dead of the night would have a high priority number. For example, the priority vector T table would contain:

| time     | 6:30pm | 7:00pm | 8:00pm | 7:30pm | ... |
|----------|--------|--------|--------|--------|-----|
| priority | 0      | 1      | 2      | 3      | ... |

An example of the data that is in the priority vector L table 230 is the following:

| length of program (hours) | 0.5 | 1.0 | 2.0 | 1.5 | 3.0 | ... |
|---------------------------|-----|-----|-----|-----|-----|-----|
| priority                  | 0   | 1   | 2   | 3   | 4   | ... |

Suppose the channel date time length (CDTL) 244 data is 5 10 19.00 1.5, which means channel 5, 10th day of the month, 7:00 PM, and 1.5 hours in length, then for the above example the $C_p, D_p, T_p, L_p$ data 248, which are the result of looking up the priorities for channel, date, time and length in priority tables 224, 226, 228 and 230 of FIG. 9, would be 4 9 1 3. Step 250 converts $C_p, D_p, T_p, L_p$ data to binary numbers. The number of binary bits in each conversion is determined by the number of combinations involved. Seven bits for $C_p$, which can be denoted as $C_7 C_6 C_5 C_4 C_3 C_2 C_1$, would provide for 128 channels. Five bits for $D_p$, which can be denoted as $D_5 D_4 D_3 D_2 D_1$, would provide for 31 days in a month. Six bits for $T_p$, which can be denoted as $T_6 T_5 T_4 T_3 T_2 T_1$, would provide for 48 start times on each half hour of a twenty four hour day. Four bits for length, which can be denoted as $L_4 L_3 L_2 L_1$, would provide for a program length of up to 8 hours in half hour steps. Together there are 7+5+6+4=22 bits of information, which correspond to 2**22=4,194,304 combinations.

The next step is to use bit hierarchy key 220, which can be stored in a read only memory to reorder the 22 bits. The bit hierarchy key 220 can be any ordering of the 22 bits. For example, the bit hierarchy key might be:

| $L_8 C_3$... | $T_2$ | $C_2$ | $T_1$ | $C_1$ | $L_1$ | $D_5$ | $D_4$ | $D_3$ | $D_2$ | $D_1$ |
|--------------|-------|-------|-------|-------|-------|-------|-------|-------|-------|-------|
| 22 21...     | 10    | 9     | 8     | 7     | 6     | 5     | 4     | 3     | 2     | 1     |

Ideally the bit hierarchy key is ordered so that programs most likely to be the subject of timer preprogramming would have a low value binary number, which would eliminate keystrokes for timer preprogramming the most popular programs. Since all the date information has equal priority, then the $D_5 D_4 D_5 D_2 D_1$ bits are first. Next $T_1 C_1 L_1$ are used, because for whatever date it is necessary to have a time channel and length and $T_1C_1L_1$ are the most probable in each case due to the ordering of the priority vectors in priority vector storage 222. The next bit in the hierarchy key is determined by the differential probabilities of the various combinations. One must know the probabilities of all the channels, times and lengths for this calculation to be performed.

For example, the probability for channels may be:

| channel | 4 | 7 | 2 | 3 | 5 | 6 | 11 | 13... |
|---|---|---|---|---|---|---|---|---|
| priority | 0 | 1 | 2 | 3 | 4 | 5 | 6 | 7... |
| probability(%) | 5 | 4.3 | 4 | 3 | 2.9 | 2.1 | 2 | 1.8... |

The probabilities for times might be:

| time | 6:30pm | 7:00pm | 8:00pm | 7:30pm | ... |
|---|---|---|---|---|---|
| priority | 0 | 1 | 2 | 3 | ... |
| probability (%) | 8 | 7.8 | 6 | 5 | ... |

And, the probabilities for lengths might be:

| length of program (hours) | 0.5 | 1.0 | 2.0 | 1.5 | 3.0... |
|---|---|---|---|---|---|
| priority | 0 | 1 | 2 | 3 | 4... |
| probability(%) | 50 | 20 | 15 | 5 | 4... |

The probabilities associated with each channel, time and length, as illustrated above, are used to determine the proper ordering. Since the priority vector tables are already ordered by the most popular channel, time, and length, the order in which to select between the various binary bits for one table, for example selecting between the $C_7C_6C_5C_4C_3C_2C_1$ bits, is already known. The $C_1$ bit would be selected first because as the lowest order binary bit it would select between the first two entries in the channel priority table. Then the $C_2$ bit would be selected and so on. Similarly, the $T_1$ and $L_1$ bits would be used before any of the other time and length bits. A combination of the $C_1, T_1, L_1$ and $D_5D_4D_3D_2D_1$ bits should be used first, so that all the information is available for a channel, date, time and length. The $D_5D_4D_3D_2D_1$ bits are all used because the date bits all have equal priority and all are needed to specify a date even if some of the bits are binary zero.

At this point the bit hierarchy key could be:

$T_1C_1L_1D_5D_4D_3D_2D_1$

The first channel binary bit $C_1$ by itself can only select between $2^1=2$ channels, and the first two channels have a probability percent of 5 and 4.3, respectively. So the differential probability of $C_1$ is 9.3. Similarly, the differential probability of $T_1$ is 8+7.8=15.8, and the differential probability of $L_1$ is 50+20=70. If the rules for ordering the bit hierarchy key are strictly followed, then the first 8 bits of the bit hierarchy key should be ordered as:

$C_1T_1L_1D_5D_4D_3D_2D_1$, because $L_1$ has the highest differential priority so it should be next most significant bit after $D_5$, followed by $T_1$ as the next most significant bit, and then $C_1$ as the next most significant bit. Notice that the bit hierarchy key starts with the least significant bit $D_1$, and then is filled in with the highest differential probability bits. This is for the purpose of constructing the most compact codes for popular programs.

The question at this point in the encoding process is what, should the next most significant bit in the hierarchy key be:

$T_2$, $C_2$, or $L_2$. This is again determined by the differential probabilities, which can be calculated from the above tables for each bit. Since we are dealing with binary bits, the $C_2$ in combination with $C_1$ selects between $2^2=4$ channels or 2 more channels over $C_1$ alone. The differential probability for $C_2$ is then the additional probabilities of these two additional channels and for the example this is: 4+3=7. In a similar manner $C_3$ in combination with $C_1$ and $C_2$ selects between $2^3=8$ channels or $4=2^{(3-1)}$ more channels over the combination of $C_1$ and $C_2$. So the differential probability of $C_3$ is the additional probabilities of these four additional channels and for the example this is: 2.9+2.1+2+1.8=8.8. In a similar manner, the differential probabilities of $T_2$ and $L_2$ can be calculated to be 6+5=11 and 15+5=20, respectively. Once all the differential probabilities are calculated, the next step is determining which combinations of bits are more probable.

Now for the above example, which combination is more probable: $T_2$ with $C_1L_1$, or $C_2$ with $T_1L_1$, or $L_2$ with $T_1C_1$. This will determine the next bit in the key. So, which is greater: 11×9.3×70=7161; 7×15.8×70=7742; or 20×15.8×9.3=2938.8? In this the greatest probability is 7×15.8×70=7742, which corresponds to $C_2$ with $T_1L_1$. So, $C_2$ is selected as the next bit in the bit hierarchy key.

The next bit is selected in the same way. Which combination is more probable: $C_3$ with $T_1L_1$, or $T_2$ with $C_1$ or $C_2$ and $L_1$, or $L_2$ with $C_1$ or $C_2$ and $T_1$. For the example shown, which has the greatest probability: 8.8×15.8×70=9732.8; 11×(9.3+7)×70=12551; or 20×(20×(9.3×7)×15.8=5150.8? In this case the combination with the greatest probability is 11×(9.3+7)×70=12551, which corresponds $T_2$ with $C_1$ or $C_2$ and $L_1$. So, $T_2$ is selected as the next bit in the bit hierarchy key. This procedure is repeated for all the differential probabilities until the entire key is found.

Alternately, the bit hierarchy key can be just some arbitrary sequence of the bits. It is also possible to make the priority vectors interdependent, such as making the length priority vector dependent on different groups of channels. Another technique is to make the bit hierarchy key 220 and the priority vector tables 222, a function of clock 42, as shown in FIG. 9. This makes it very difficult for the key and therefore the coding technique to be duplicated or copied.

For example it is possible to scramble the date bits in the bit hierarchy key 220 as a function of the clock. Changing the order of the bits as a function of the clock would not change the effectiveness of the bit hierarchy key in reducing the number of binary bits for the most popular programs, because the date bits all are of equal priority. This could be as simple as switching the D1 and D5 bits periodically, such as every day or week. Thus the bit hierarchy key 220 would switch between $C_1T_1L_1D_5D_4D_3D_2D_1$ and $C_1T_1L_1D_1D_4D_3D_2D_5$ Clearly other permutations of the bit hierarchy key as a function of the clock are possible.

The priority vector tables could also be scrambled as a function of the clock. For example, the first two channels in the priority channel table could just be swapped periodically. If this technique is followed, then the Cp of 248 in FIG. 9 would change as a function of the clock 42. For example,

| channel | 4 | 7 | 2 | 3 | 5 | 6 | 11 | 13 | ... |
|---|---|---|---|---|---|---|---|---|---|
| priority | 0 | 1 | 2 | 3 | 4 | 5 | 6 | 7 | ... | would change periodically to:

| Channel  | 7 | 4 | 2 | 3 | 5 | 6 | 11 | 13 | ... |
|----------|---|---|---|---|---|---|----|----|-----|
| priority | 0 | 1 | 2 | 3 | 4 | 5 | 6  | 7  | ... |

This would be a fairly subtle security technique, because a decoder that was otherwise correct would only fail if those first two channels were being used. Other clock dependencies are also possible to provide security for the coding technique.

However it is derived, the bit hierarchy key 220 is determined and stored. In step 254 the binary bits of $C_p, D_p, T_p, L_p$ are rearranged according to the bit hierarchy key 220 to create one 22 bit binary number. Then the resulting 22 bit binary number is converted to decimal in the convert binary number to decimal compressed code step 256. The result is compressed code 258.

If the priority vector and the bit hierarchy key are well matched to the viewing habits of the general population, then it is expected that the more popular programs would require no more than 3 or 4 digits for the compressed code.

Now that the encoding technique has been explained the decoding technique is just reversing the coding technique. This is done according to the flow chart of FIG. 8.

The first step 202 is to enter compressed code 204. Next the compressed code 204 is converted to a 22 bit binary number in step 206. Then the bits are reordered in step 208 according to the bit hierarchy key 220 to obtain the reordered bits 210. Then the bits are grouped together and converted to decimal form in step 212. As this point we obtain $C_p, D_p, T_p, L_p$ data 214, which are the indices to the priority vector tables. For the above example, we would have at this step the vector 4 9 1 3. This $C_p, D_p, T_p, L_p$ data 214 is then used in step 216 to look up channel, date, time, and length in priority vector storage 222. The CDTL 218 for the example above is 5 10 19.00 1.5, which means channel 5, 10th day of the month, 7:00 PM, and 1.5 hours in length.

If the coding technique is a function of the clock then it is also necessary to make the decoding technique a function of the clock. It is possible to make the bit hierarchy key 220 and the priority vector tables 222, a function of clock 42, as shown in FIG. 8. This again makes it very difficult for the key and therefore the coding technique to be duplicated or copied. It is also possible to have the decoding and encoding techniques dependent on any other predetermined or preprogrammable algorithm.

Figure 10:
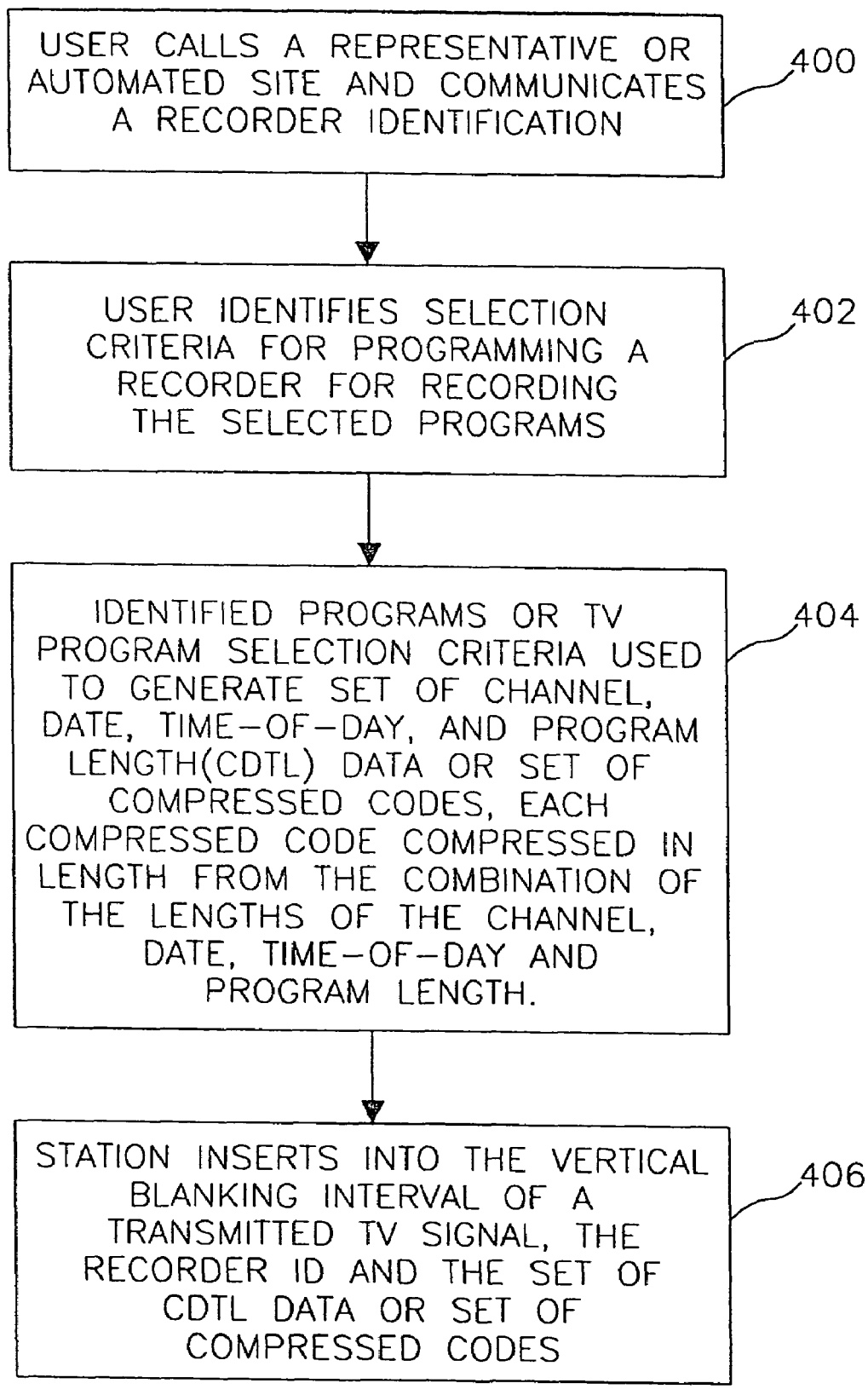
FIGS. 10-13 are flow graphs of methods for controlling the recording of video programs according to the present invention.

FIGS. 10 to 13 are flow graphs of methods for controlling the recording of video programs according to the present invention. FIG. 10 is a flow graph of a method for a user to set up the download of information in the vertical blanking interval and for a station to insert the required data into the vertical blanking interval of a transmitted television signal. In step 400 a user calls a representative and communicates a recorder identification. Then in step 402 the user identifies programs or program selection criteria for programs to be recorded. Then in step 404 the identified program or program selection criteria are used to generate a set or sets of channel, date, time-of-day and program length (CDTL) data, or in step 404 the identified program or program selection criteria are used to generate a set of compressed codes. Each compressed code compressed in length from the combination of the lengths of the channel, date, time-of-day and program length. Then in step 406 the station inserts into the vertical blanking interval of a transmitted TV signal the recorder identification and the set or sets of CDTL data or compressed codes. It is possible for the recorder programming data to be a mix of compressed codes and CDTL data.

Figure 11:
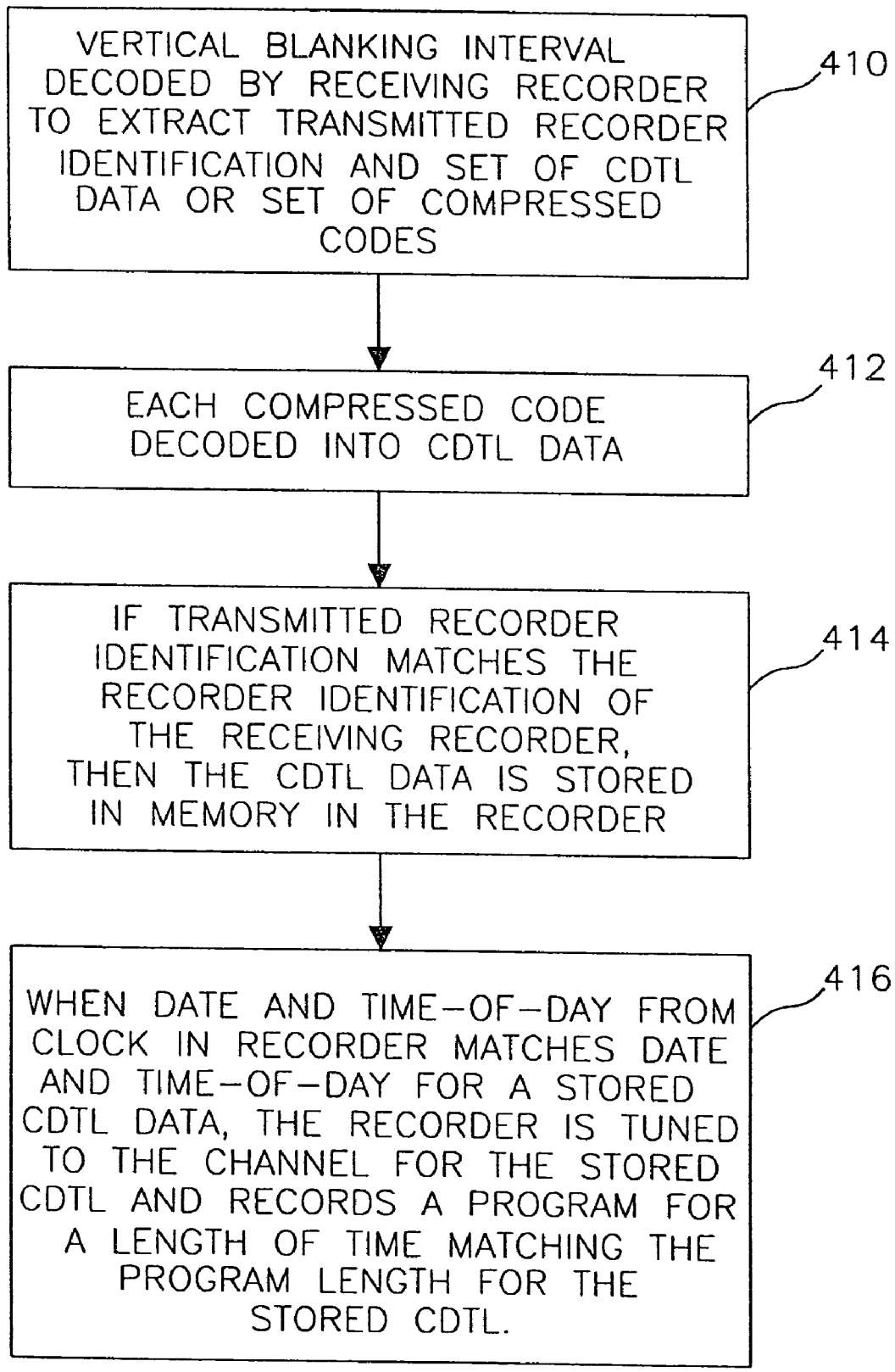

FIG. 11 is a flow graph of a method for retrieving recorder program data from a vertical blanking interval for controlling the recording of programs on a recorder. In step 410 the vertical blanking interval is decoded by a receiving recorder to extract a transmitted recorder identification and recorder programming data, consisting of CDTL data and/or compressed codes. Then in step 412 each compressed code is decoded into CDTL data. Then in step 414 if the transmitted recorder identification matches the recorder identification of the receiving recorder then the CDTL data is stored in memory in the recorder. Then in step 416 when the date and time-of-day from a clock in the recorder matches the data and time-of-day for a stored CDTL, the recorder is tuned to the channel for the stored CDTL and records the program for a length of time matching the program length for the stored CDTL.

Figure 12:
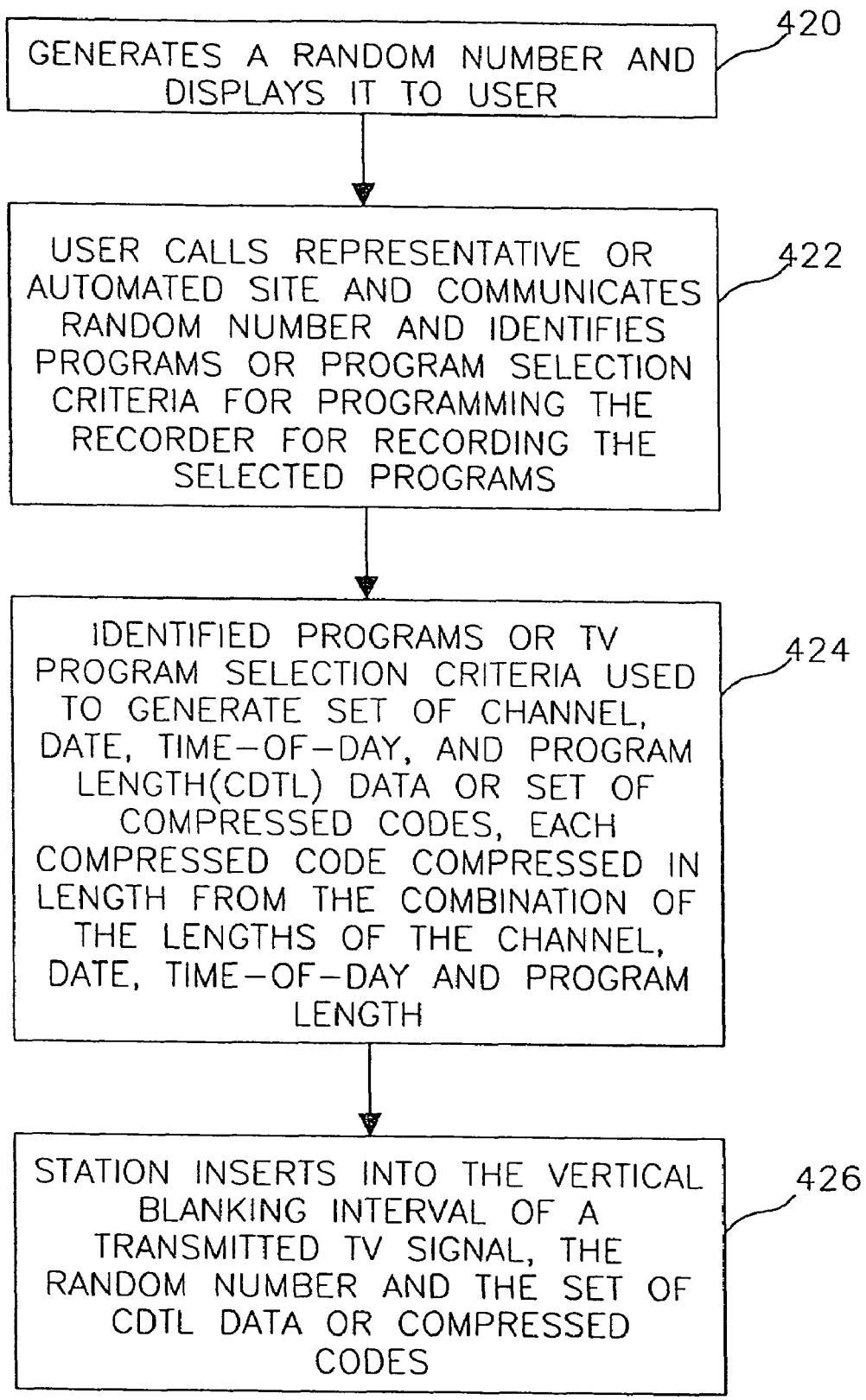

FIG. 12 is a flow graph that is similar to the flow graph of FIG. 10 except that a random number is used for the recorder identification. In step 420 the recorder generates a random number and displays it to the user. Then in step 422 the user calls a representative or an automated remote site and communicates the random number and identifies programs or program selection criteria for programs to be recorded. In step 424 the identified programs or the program selection criteria are used to generate a set of channel, date, time-of-day and program length (CDTL) data for a set of compressed codes wherein each compressed code is compressed in length from the combination of the lengths of the channel, date, time-of-day and program length. Then in step 426 the station inserts into the vertical blanking interval of a transmitted television signal the random number and the set of CDTL data and/or compressed codes.

Figure 13:
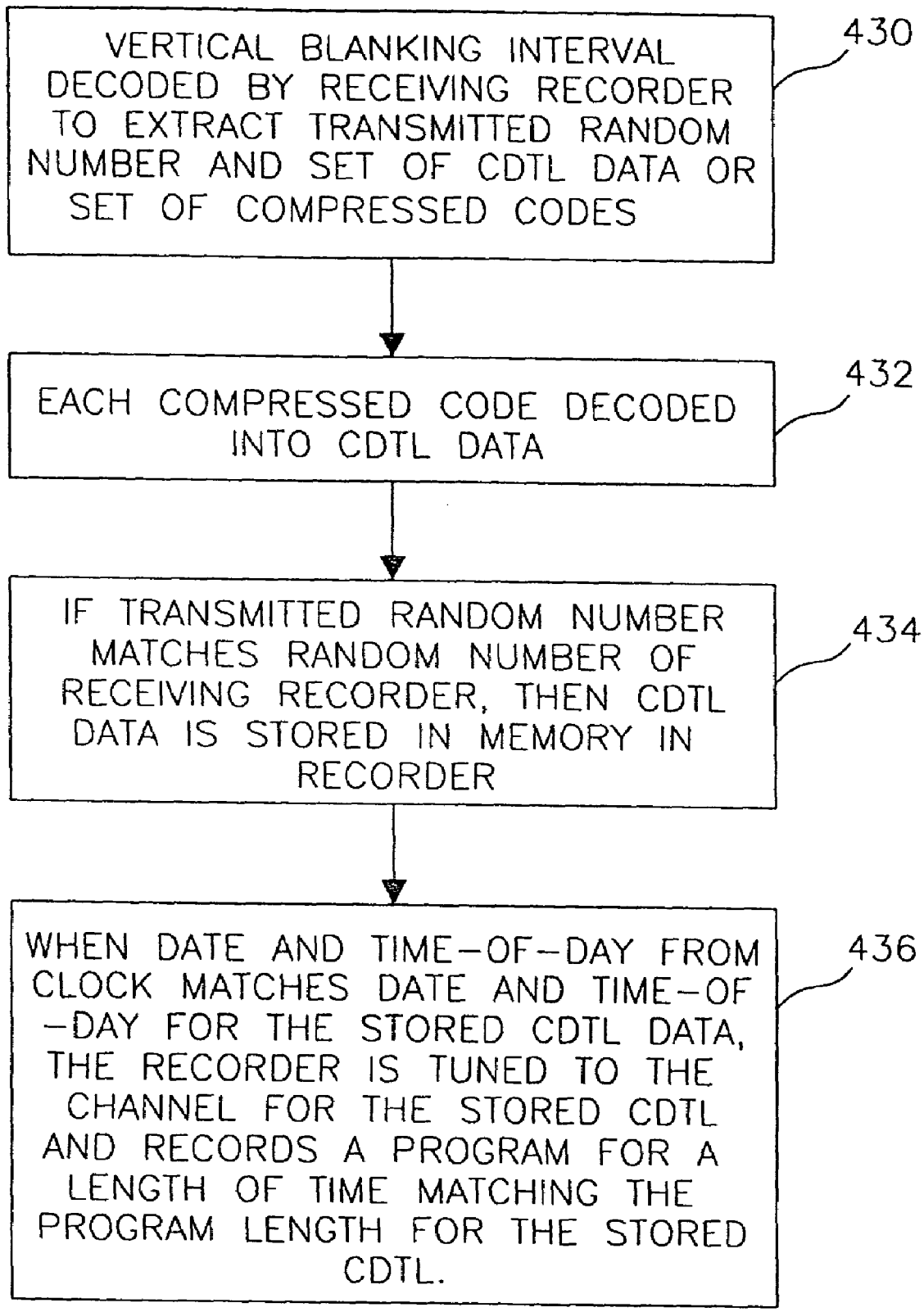

FIG. 13 is a flow graph for retrieving the recorder programming data from the vertical blanking interval. In step 430 the vertical blanking interval is decoded by the receiving recorder to extract a transmitted random number and a set of CDTL data or a set of compressed codes. Then in step 432 each compressed code is decoded into CDTL data. Then in step 434, if the transmitted random number matches the random number of the receiving recorder then the CDTL data is stored in memory in the recorder. Then in step 436 when the date and time-of-day from a clock in the VCR matches the date and time-of-day for the stored CDTL data, the recorder is tuned to the channel for the stored CDTL and records a program for a length of time matching the program length for the stored CDTL data.

As used herein, the term "telecast" refers to point-to-multipoint signal transmission.

Thus, there has been described a simpler system for accomplishing recorder programming, which will enable the user to take advantage of the recording feature of a recorder more freely.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

The invention claimed is:

1. A method of transmitting recorder programming data to control recording of a television program, the method comprising:
   generating an identifier that is unique to at least one of a plurality of user terminals by:
      initiating counting of a first counter and a second counter;
      halting the counting of the first counter responsive to receipt of a first user command;
      halting the counting of the second counter responsive to receipt of a second user command; and
      combining the first counter and the second counter to serve as the unique identifier;
   receiving at a remote site:
      the unique identifier; and
      program information identifying a television program to be recorded, wherein the identifier and the program information are provided from a user device separate from the at least one of a plurality of user terminals;
   inserting into a broadcast information signal at the remote site the unique identifier and recorder programming data, wherein the broadcast information signal includes television programming and wherein the recorder programming data is used to control the recording of the television program; and
   transmitting the broadcast information signal to the plurality of user terminals, such that the recorder programming data is only stored at the at least one of the plurality of user terminals having the unique identifier.

2. The method of claim 1, further comprising:
   automatically generating a random number to serve as the unique identifier, wherein the value of the generated random number does not depend on user input.

3. The method of claim 1, wherein the at least one of the plurality of user terminals comprises a video cassette recorder.

4. The method of claim 1, wherein the recorder programming data comprises channel, date, time-of-day, and program length data signals.

5. The method of claim 4, wherein the channel, date, time-of-day, and program length data signals are in the form of a compressed code.

6. The method of claim 1, wherein the remote site comprises a network head end or a local cable head end.

7. The method of claim 1, wherein the inserting comprises inserting the unique identifier and the recorder programming data into a vertical blanking interval of the broadcast information signal.

8. The method of claim 1, wherein the user device is a telephone and wherein the receiving comprises receiving the unique identifier and the program information over a telephone line.

9. The method of claim 1, wherein the initiating comprises initiating the counting of the first counter and the second counter responsive to conditions at the time of initial operation of the at least one of the plurality of user terminals.

10. The method of claim 1, further comprising:
    utilizing the recorder programming data stored at the at least one of the plurality of user terminals to control the recording of the television program at the user terminal.

11. The method of claim 1, wherein the unique identifier is generated at the at least one of the plurality of user terminals.

12. A system for transmitting recorder programming data to control recording of a television program, the system comprising:
    a generator for generating an identifier that is unique to at least one of a plurality of user terminals, wherein the unique identifier is generated by initiating counting of a first counter and a second counter, halting the counting of the first counter responsive to receipt of a first user command, halting the counting of the second counter responsive to receipt of a second user command, and combining the first counter and the second counter; and
    a remote site operative to communicate with a plurality of user terminals and operative to:
        receive from a user device:
            the unique identifier; and
            program information provided by a user, wherein the program information identifies a television program to be recorded, and
            wherein the user device is separate from the at least one of the plurality of user terminals; and
        transmit to the plurality of user terminals a broadcast information signal, the broadcast information signal comprising television programming, the unique identifier, and recorder programming data, wherein the recorder programming data is used to control the recording of the television program, such that the recorder programming data is only stored at the at least one of the plurality of user terminals having the unique identifier.

13. The system of claim 12 wherein the unique identifier is automatically generated, and wherein the value of the generated unique identifier does not depend on user input.

14. The system of claim 12 wherein the at least one of the plurality of user terminals comprises a video cassette recorder.

15. The system of claim 12 wherein the recorder programming data comprises channel, date, time-of-day, and program length data signals.

16. The system of claim 15 wherein the channel, date, time-of-day, and program length data signals are in the form of a compressed code.

17. The system of claim 12 wherein the remote site comprises a network head end or a local cable head end.

18. The system of claim 12 wherein the unique identifier and the recorder programming data is inserted into a vertical blanking interval of the broadcast information signal.

19. The system of claim 12 wherein the user device is a telephone, and wherein the unique identifier and the program information are received over a telephone line.

20. The system of claim 12 wherein the counting of the first counter and the second counter is initiated responsive to conditions at the time of initial operation of the at least one of the plurality of user terminals.

21. The system of claim 12 wherein the recorder programming data is utilized at the at least one of the plurality of user terminals to control the recording of the television program at the user terminal.

22. The system of claim 12 wherein the unique identifier is generated at the at least one of the plurality of user terminals.

* * * * *

UNITED STATES PATENT AND TRADEMARK OFFICE
CERTIFICATE OF CORRECTION

PATENT NO. : 7,636,511 B2  Page 1 of 1
APPLICATION NO. : 10/919804
DATED : December 22, 2009
INVENTOR(S) : Yee K Ng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this

Ninth Day of November, 2010

David J. Kappos
*Director of the United States Patent and Trademark Office*